Figure 1:
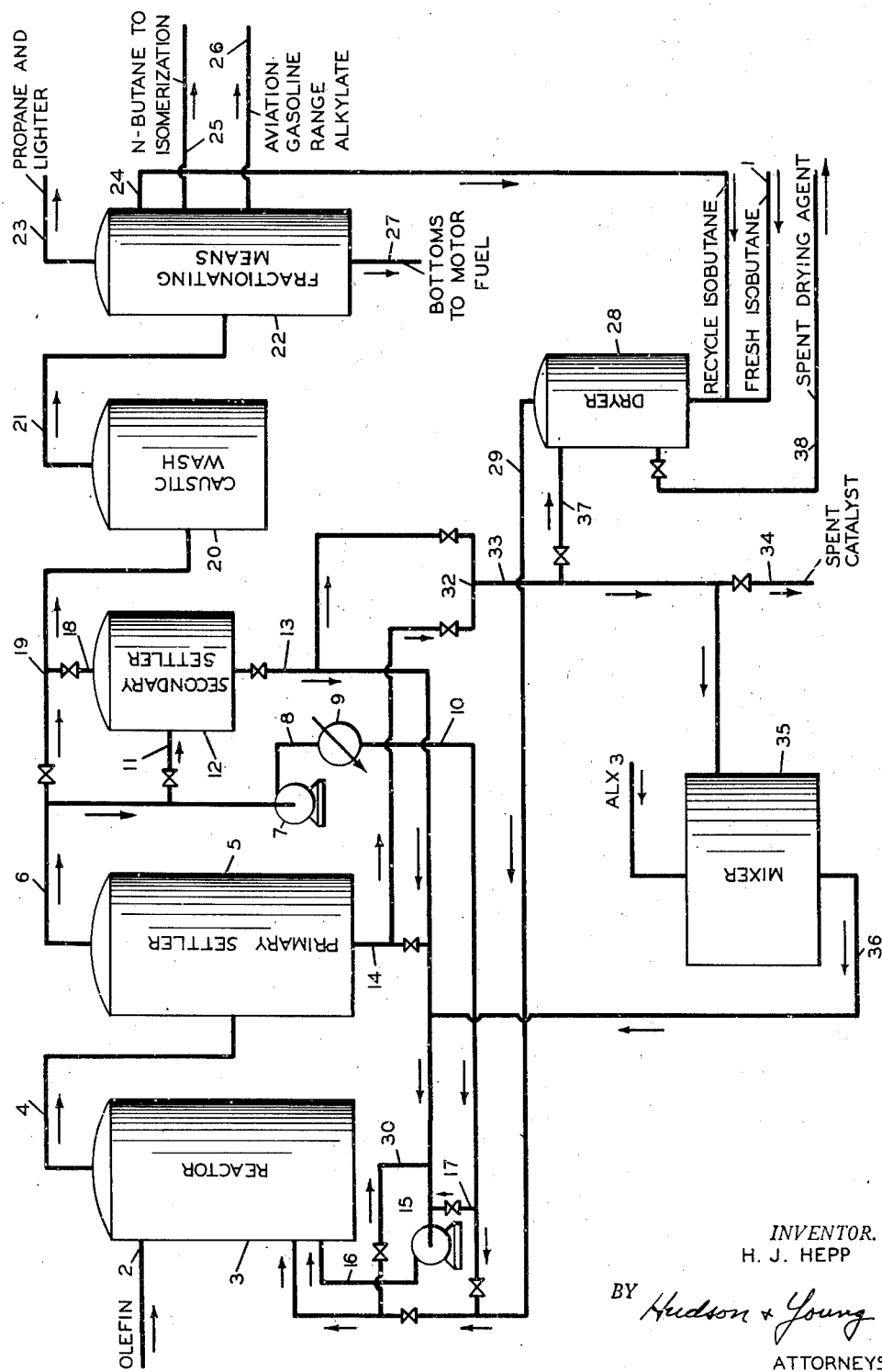

March 8, 1949.　　　H. J. HEPP　　　2,463,768
ALKYLATION PROCESS
Filed Sept. 5, 1945　　　2 Sheets-Sheet 1

INVENTOR.
H. J. HEPP
BY Hudson & Young
ATTORNEYS

March 8, 1949. H. J. HEPP 2,463,768
ALKYLATION PROCESS
Filed Sept. 5, 1945 2 Sheets-Sheet 2

INVENTOR.
H. J. HEPP
BY Hudson & Young
ATTORNEYS

UNITED STATES PATENT OFFICE 2,463,768

ALKYLATION PROCESS

Harold J. Hepp, Bartlesville, Okla., assignor to Phillips Petroleum Company, a corporation of Delaware Application September 5, 1945, Serial No. 614,575

3 Claims. (Cl. 260—683.4)

This invention relates to the conversion of hydrocarbons in the presence of aluminum halide catalysts. In particular embodiments it relates to alkylation of alkylatable hydrocarbons by reaction with low-boiling olefins in the presence of liquid hydrocarbon-aluminum halide catalysts. In one specific embodiment it relates to the reaction of isobutane and ethylene to produce diisopropyl.

Aluminum halide catalysts have been used in numerous processes for the conversion of hydrocarbons, including decomposition or cracking of high-boiling hydrocarbons, isomerization of low-boiling hydrocarbons, and alkylation of alkylatable hydrocarbons, including isoparaffins, normal paraffins, cycloparaffins, and aromatic hydrocarbons. In such processes these catalysts have been used as such, suspended in or dissolved in a reaction mixture, suspended on solid supports such as active carbon, activated alumina or aluminous materials such as bauxite, active silica, and various clays such as fuller's earth, kieselguhr, etc., and as separate liquids in the form of complexes with organic and inorganic compounds. The more useful of the liquid complexes are those formed with paraffinic hydrocarbons, especially those formed with more or less highly branched, normally liquid paraffin hydrocarbons boiling in the boiling ranges of those fractions generally identified as gasoline and kerosine. In most instances it is desirable to have present a small amount of a hydrogen halide, sometimes only about 0.01 to about 1 to 5 per cent by weight. This material may be present as a result of side reactions, such as when water is present in a charge stock, when an organic halogen compound is present in a charge stock, when some interreaction between an aluminum halide and hydrocarbon takes place, or when a hydrogen halide is deliberately added. Since it is substantially impossible to effect complete dehydration of all equipment and materials, especially in a commercial process, conversions with aluminum halide catalysts are often conducted without the knowledge or appreciation that minor amounts of a hydrogen halide are present. Aluminum halide hydrocarbon complexes may also be formed by the reaction of aluminum halide with hydrocarbon material produced during the alkylation process; that is, the alkylation reaction, for example, may be initially utilizing aluminum halide per se in the presence or absence of a promoter as the catalyst but after the reaction has progressed the aluminum halide will react with the paraffinic alkylate to form a complex which may be recycled and which will function as the catalyst.

The usual method of conducting hydrocarbon alkylation reactions using a liquid aluminum halide complex catalyst in a continuous process is to bring together the catalyst and a liquid hydrocarbon in a reaction zone and withdrawing from the reactor to a settler liquid hydrocarbon-catalyst mixture. Fresh hydrocarbon reactants are continuously supplied to the reactor. In the settler, the catalyst and hydrocarbons are separated, for example, by gravity settling, and the substantially catalyst-free hydrocarbon mixture removed from the settler to recovery means. The substantially hydrocarbon-free catalyast in the settler is recycled to the reaction by suitable means, as for example, by means of a pump.

As pointed out in my copending application, Serial No. 541,758, filed June 23, 1944, now U. S. 2,410,498, issued November 5, 1946, the viscosity of the catalyst has an important bearing on the ease of operation of such a process. A very fluid catalyst greatly facilitates the intimate contacting of the catalyst and hydrocarbon in the reaction zone, as well as offering minimum difficulties in pumping and otherwise handling the catalyst outside the reactor.

In the alkylation of alkylatable hydrocarbons with olefins, it is desirable to maintain a high degree of contacting between the hydrocarbon and catalyst phases in the reaction zone, as inefficient mixing adversely affects alkylate quality and catalyst life. Intimate mixing may be effected by mechanical agitators, jets, or similar means.

Other conditions being equal, increased catalyst viscosity demands increased power input to the reaction zone to maintain a given degree of catalyst dispersion; or, with constant power input, increased catalyst viscosity reflects itself in decreased mixing of catalyst and hydrocarbon. In the catalyst recycle operation, a viscous catalyst renders difficult the operation of pumping the settled catalyst from the settler back to the reaction zone.

In my copending application, a method whereby the viscosity of an aluminum chloride-hydrocarbon complex catalyst can be maintained at the desired low values in alkylation utilizing ethylene as the major olefin was disclosed. The means disclosed reside in the discovery that if ethylene concentration is allowed to rise above about 2 mol per cent of the reactor effluent hydrocarbon, the catalyst gradually becomes viscous, probably due to ethylene polymerization and subsequent reaction with the complex. Catalyst viscosity remains low if ethylene conversion is maintained such that the effluent ethylene concentration is not above this value. On the other hand, at nearly complete ethylene conversion, alkylate quality is decreased due to disproportionation, isomerization and other reactions affecting the alkylate.

Heretofore, when feed stocks containing substantial amounts of propylene and/or butenes have been alkylated with an isoparaffin in the presence of this catalyst, it has not been possible to maintain fluidity under conditions of catalyst activity that yielded alkylates of high heptanes and/or octanes content. These are desirable because of their high octane rating. In order to maintain fluidity of the catalyst, it was necessary to increase the activity of the catalyst to such a point that serious loss in antiknock properties of the alkylate resulted.

I have now discovered that catalyst viscosity may be maintained at desired low values in the alkylation with ethylene and higher-boiling olefins, either alone or in mixtures, by maintaining the catalyst at all times throughout its cycle in intimate contact with an alkylatable hydrocarbon. As will be apparent from the later discussion, the practice of my invention results not only in the production of highest quality alkylate from a given feed stock, but also results in a minimum consumption of aluminum halide, that is, improved catalyst life.

It is an object of this invention to provide a process for the conversion of hydrocarbons in the presence of a liquid aluminum halide-hydrocarbon complex catalyst.

It is a further object of this invention to provide a process for the alkylation of an alkylatable hydrocarbon with an olefin in the presence of a liquid aluminum halide-hydrocarbon complex catalyst.

It is another object of this invention to provide a process for the alkylation of an alkylatable hydrocarbon with an olefin in the presence of a liquid aluminum halide-hydrocarbon complex catalyst in which the catalyst is maintained at low viscosity.

Still another object of this invention is to provide a process using a liquid aluminum halide-hydrocarbon complex catalyst for the alkylation of alkylatable hydrocarbons with propylene to give high yields of primary alkylate, for example, propylene and isobutane to yield heptanes, in which the catalyst is maintained at low viscosity.

Still another object of this invention is to provide a process using a liquid aluminum halide-hydrocarbon complex catalyst for the alkylation of alkylatable hydrocarbons with butylenes to give high yields of primary alkylate, for example, isobutane and butylenes to give octanes, in which the catalyst is maintained at low viscosity.

Still another object of this invention is to provide a process using a liquid aluminum halide-hydrocarbon complex catalyst for the alkylation of alkylatable hydrocarbons with olefins by which increased catalyst life is obtained.

Several aluminum halides are utilized as catalysts in the form of liquid complexes of hydrocarbons, the more common of which are aluminum bromide and aluminum chloride, through aluminum fluoride and mixed salts such as $AlF_2Cl$ and $AlFCl_2$ are usable as hydrocarbon complexes. Aluminum chloride will probably be the most common of the aluminum halides to be used in the catalyst complex in practicing this invention, but it is within the broadest concepts of this invention to use other aluminum halides as well.

Fluid aluminum halide-hydrocarbon complexes may be prepared by heating aluminum halide with paraffins, cycloparaffins, aromatics, or olefins, usually in the presence of HCl. In carrying out my process, the initial catalyst charge may be made up in this manner, or be obtained from the excess catalyst formed in a plant already operating. Whatever its nature, the initial catalyst is soon displaced by aluminum halide-hydrocarbon complex formed during the alkylation, and this is the catalyst employed except during the starting-up period.

I have now discovered that the viscosity of such catalysts may be maintained below about 1000 centistokes at 100° F., and more usually in the range of 100 to 200 centistokes by so conducting the alkylation that the catalyst phase is maintained in intimate contact with an alkylatable hydrocarbon, not only in the reaction zone proper, but also during the time the catalyst is in the settling zone and catalyst recycle lines and pumps.

Figure 2:
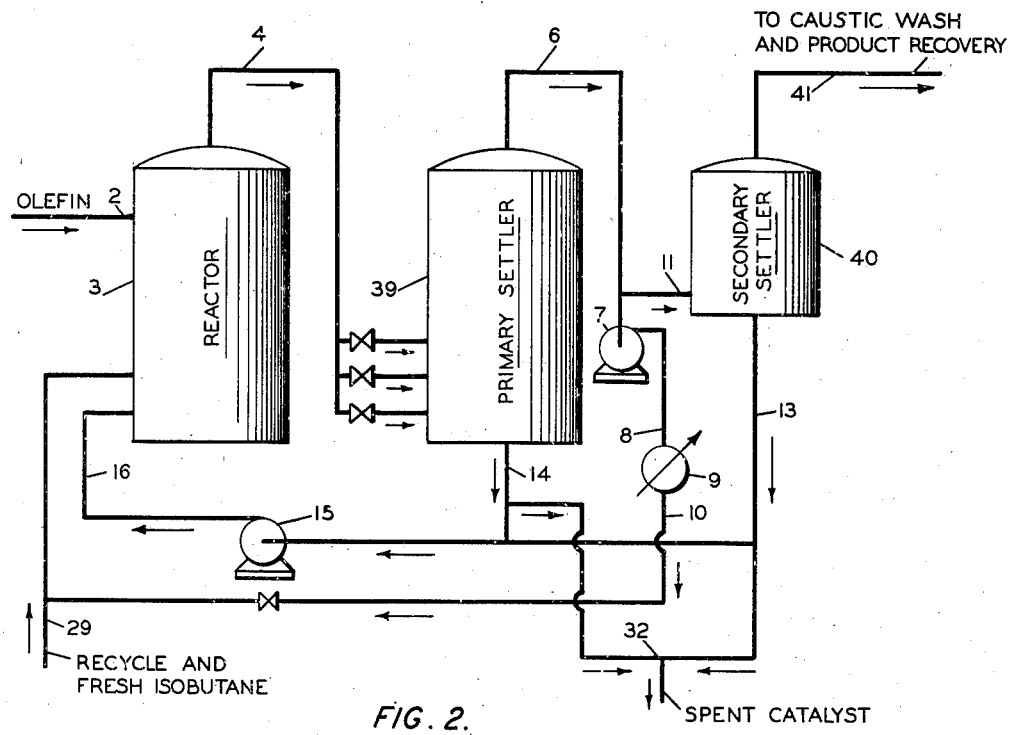
Figure 3:
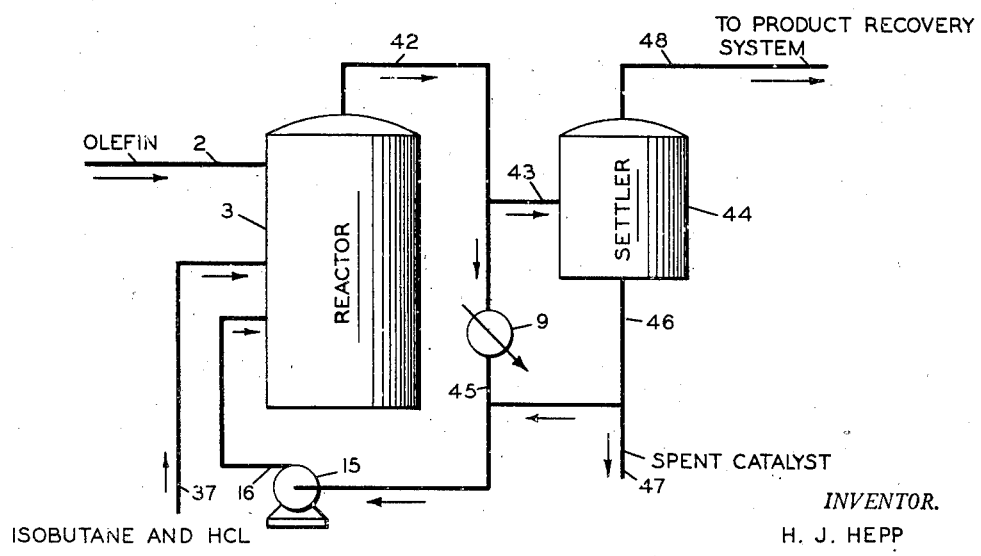

This may be accomplished by a variety of means, such as permitting only partial settling of the catalyst in the catalyst settling vessel, redispersing catalyst and hydrocarbon by means of centrifugal pumps and the like. Several modifications of my invention are shown in Figures 1, 2 and 3, which are described below.

By this means, not only ethylene, but also propylene and the butenes may be reacted with alkylatable hydrocarbons in the presence of fluid aluminum halide-hydrocarbon complex catalysts to yield alkylates rich in the desirable, high quality, primary reaction product while maintaining catalyst fluidity. This result has not hitherto been accomplished with propylene and the butenes.

The exact mechanisms involved in the alkylation reactions carried out in the presence of aluminum halide catalysts are not known with certainty.

It is possible, however, to account for many of the observed facts in alkylation of the type discussed in a logical manner, and thereby more clearly bring out the nature of my invention. However, in the light of the uncertainty of the mechanisms involved at the present state of development of the art, this discussion is not to be interpreted to place any limitation on this invention.

The following overall reactions may be postulated to explain the interactions of catalyst and hydrocarbons that lead to the formation of observed products and aluminum chloride consumption. While shown for the ethylene-isobutane reaction, it will be understood that it applies to other olefins and alklatable hydrocarbons also.

(1) Ethylene+catalyst→Complex A
(2) Complex A+isobutane→Diisopropyl+catalyst
(3) Complex A+complex A→Complex B
(4) Complex B+isobutane→$C_8$ and heavier alkylate
(5) Complex B+complex A→Complex C
(6) Complex C+$AlCl_3$→Inactive complex In reaction 1 it is postulated that olefin is absorbed into the catalyst phase, possibly in the form of a loose complex of some sort, which for convenience is designated as complex A.

Reaction 2 expresses the overall juncture reaction leading to the formation of alkylate. This reaction may, and probably does, proceed as outlined by Schmerling (J. A. C. S. 66, No. 8, 1422 (1944)), or Bartlett, Condon, and Schneider (J. A. C. S. 66, No. 8, 1531–9 (1944)). The reaction of isoparaffin and dissolved olefin, or at least the rate limiting step, occurs at the interface between the catalyst and hydrocarbon phases. Consequently, it is necessary to provide intimate contacting of the catalyst and hydrocarbon phases to encourage maximum alkylation and minimum side reactions.

If sufficient contacting is not provided, or if catalyst activity is too low, Reaction 2 proceeds relatively slowly, permitting the concentration of complex A to increase. When this happens, the rate of Reaction 3, which results in the polymeric complex B, increases rapidly, probably as the square of the concentration of complex A. Complex B may polymerize still further through interaction with other olefinic complexes (Reaction 5) to yield viscous derivatives which increase the viscosity of the catalyst phase.

These polymeric complexes may react with aluminum chloride to form stable $AlCl_3$-hydrocarbon complexes of low activity as catalysts for the alkylation reaction, possibly by the formation of primary valence linkages (Reaction 6). This latter reaction results in the increased $AlCl_3$ consumption observed at low ethylene conversions.

From this discussion it is believed that when the catalyst has poor access to the alkylatable paraffin, as in a catalyst settling zone where substantially complete settling occurs, polymerization of the olefinic complexes with resultant increase in catalyst viscosity and $AlCl_3$ consumption is favored. On the other hand, if the catalyst has good access at all times to the alkylatable hydrocarbon, alkylation can occur at good rates, thereby minimizing the polymerizations by reducing the concentration of these olefinic complexes.

Aluminum chloride is the halide which will most generally be used in the practice of my invention although it is not outside of the broadest concepts of the invention to use other aluminum halides, particularly aluminum bromide. While aluminum fluoride generally does not give completely satisfactory results, mixed halides such as $AlCl_2F$, $AlClF_2$, $AlBr_2F$, and the like, may often be used successfully. Liquid hydrocarbon-aluminum halide catalysts are generally prepared by reacting a relatively pure and substantially anhydrous aluminum halide with a paraffin hydrocarbon, or paraffinic hydrocarbon fraction, at a temperature between about 150 and about 230° F. Usually, but not always, it is desirable to effect the production of the catalyst by adding during its formation a small amount of a hydrogen halide and to mix vigorously the hydrocarbon and aluminum halide until the resulting complex contains in combination from about 40 to about 70 per cent by weight of aluminum halide. Satisfactory fluid complexes have been prepared from a variety of paraffin hydrocarbons including normal heptane, isooctane, a paraffinic alkylate fraction resulting from reaction of isobutane and butylenes, and boiling above 350° F., an olefinic polymer fraction boiling in the upper part of the gasoline range, and kerosine. An essential requirement for the preparation of a good catalyst appears to be the use of a sufficiently powerful mixing to maintain the aluminum halide and the hydrocarbon in intimate contact during the period the catalyst is being prepared. In the initial stage individual particles of aluminum halide appear to become coated with a layer of sticky complex and if the mixing power is not great enough such particles tend to accumulate and/or agglomerate to form a viscous mass which settles to the bottom of the reaction vessel and further formation of the desired complex is inhibited or prevented, since unreacted aluminum halide no longer has access to the hydrocarbon phase. Two general types of catalyst have been prepared. These may be characterized as high-aluminum halide and low-aluminum halide types. When preparing a catalyst with aluminum chloride the high-aluminum chloride type contains 80 to 85 per cent by weight of aluminum chloride and is a yellow highly viscous material. The low-aluminum chloride type contains about 55 per cent by weight of aluminum chloride, is a fluid red-brown oil having a viscosity less than 200 centistokes at 100° F., and is used as the actual catalyst. The high-aluminum chloride type can be added during a continuous run in small amounts to the recirculated catalyst in order to maintain catalyst activity. Catalyst activity, however, can be maintained in other ways as by adding aluminum halide directly to recirculated catalyst or by dissolving aluminum halide in one of the streams charged to the reaction zone. The liquid complex should not be contaminated with water or other reactive, oxygen-containing compounds.

The ultimate test as to whether or not the catalyst has suitable activity is to observe the amount of unreacted ethylene present in the reaction zone. This can generally be accomplished by analyzing the effluent stream from the reaction zone since, with adequate mixing of the hydrocarbon reaction mixture and the catalyst in the zone, this effluent stream will have very nearly the same composition as the hydrocarbon phase in the reaction zone. It appears, however, that a rough estimation of the catalyst activity may be obtained by determining the heat evolved when water is added to a sample of the catalyst. When this test is made at room temperature, a satisfactory catalyst will generally produce between about 275 and 350 calories per gram, preferably between about 310 and about 330 calories per gram, when sufficient water has been added to effect complete reaction.

The catalyst itself is substantially insoluble in hydrocarbons and hydrocarbons are not substantially soluble in it. It is preferred to have a volume ratio of hydrocarbons to catalyst in the reaction zone between about 9:1 and about 1:1 and the preferred ratio has been found to be about 3:2. When the reaction mixture is maintained intimately admixed with the catalyst under the preferred conditions the hydrocarbon phase is the continuous phase and the catalyst phase is the discontinuous phase. Under these conditions the catalyst readily separates from the hydrocarbons and power requirements in order to maintain a suitable intimate admixture are not excessive. However, when a greater amount of catalyst is used, it has been found that a phase inversion may take place with the result that the catalyst phase is the continuous phase and the hydrocarbon phase the discontinuous phase, which is not nearly so satisfactory. Under such conditions it is quite difficult to obtain adequate physical separation between the hydrocarbon phase and the catalyst phase and a considerable amount of power is required in order to adequately mix hydrocarbons and catalyst charged to the reaction zone.

Under the preferred conditions adequate and intimate admixing of hydrocarbons and catalyst may be obtained by efficient stirrers, by injecting reactants into the reaction zone in jets with stream velocities of 50 to 500 feet per second, by turbulent flow conditions through a long tube coil, by intimately contacting hydrocarbons and catalysts concurrently or counter currently in vertical towers containing suitable baffle elements, or by other suitable means.

A preferred reaction temperature for this conversion is between about 50 and about 200° F., preferably about 80 to about 150° F. When alkylating hydrocarbons the activity of the catalyst herein described is sufficiently high that even ethylene undergoes rapid reaction within this temperature range. It is generally preferred to operate under a pressure such that the hydrocarbons are present in the reaction zone substantially in liquid phase and in many instances the hydrocarbon material will be kept in completely liquid phase under the preferred reaction conditions. The flow rate of reactants to the reaction zone is preferably expressed in terms of amount of product produced, and when reacting isobutane with ethylene to produce diisopropyl I prefer to operate at flow rates between about 0.2 and about 1.5 gallons of total alkylate produced per gallon of catalyst present in the reactor per hour. Thus, when reacting isobutane and ethylene in a reactor having a total internal volume of 1,000 gallons and with a hydrocarbon to catalyst ratio within the reactor of 3:2 and a flow rate of 1.25 gallons of alkylate per gallon of catalyst per hour, the flow rate of alkylate should be such that 500 gallons of alkylate are produced per hour.

The relative ease with which propylene and butenes undergo polymerization compared with ethylene is responsible for the difficulty heretofore encountered in the alkylation of these hydrocarbons in the presence of $AlCl_3$-hydrocarbon complex catalysts. It is essential to increase alkylation rate relative to polymerization to maximum values by maintaining intimate contact between catalyst and alkylatable hydrocarbon throughout the entire catalyst cycle, and by maintaining catalyst activity at as high a level as possible without adverse effect on alkylate quality. While catalyst activity is in this case difficult to measure, it may be described in terms of the pentane content of the alkylate, since this increases with increased catalyst activity. A catalyst of suitable activity for the alkylation of propylene or butenes is one which yields an alkylate containing 5 to 10 per cent of pentanes. In general, such a catalyst has a heat of solution in water in the range of 320 to 360 calories per gram.

In the drawings, Figures 1, 2 and 3 are flow diagrams representing different modifications of my invention. These are described below.

Referring to Figure 1, fresh isobutane from a source not shown is introduced to the system through pipe 1, joining the recycle isobutane in pipe 24, both being conducted to dryer 28. The drying agent in this dryer may be spent aluminum halide-hydrocarbon complex catalyst from the reaction zone, in which case a molar equivalent of hydrogen halide is generated for any water present, or any other efficient drying medium, such as bauxite, active alumina, etc., may be used. The use of spent catalyst has the advantage in reactions in which a hydrogen halide is used as an activator of furnishing at least a part of the activator from the spent catalyst.

The dried isobutane is conducted by pipe 29 to reactor 3. Reactor 3 is provided with a means of effecting intimate dispersion of catalyst in the hydrocarbon phase. Olefin from a source not shown is continuously added to the reactor through pipe 2. Pressure is maintained in the reactor at a level such that the hydrocarbon and catalyst are kept substantially in liquid phase. The hydrocarbon-catalyst liquid volume ratio in the reactor is maintained at not less than 1:1, and preferably not above 3:2. At ratios of less than 1:1, phase inversion in which the catalyst becomes the continuous phase may occur.

In the reactor, the hydrocarbon and catalyst are very intimately mixed so the alkylation reaction takes place under conditions favoring this reaction.

Hydrocarbon-catalyst emulsion is continuously withdrawn from the reactor through pipe 4 to primary settler 5. In this settler, the upper portion is occupied by hydrocarbon containing a trace of catalyst. On proceeding downward, increasing concentrations of catalyst are encountered, the hydrocarbon being the continuous phase and catalyst the discontinuous phase until the hydrocarbon to catalyst volume ratio approximates 1:1. At this point, phase inversion takes place, and on passing to a lower zone in the settler, the catalyst makes up the major portion of the mixture and constitutes the continuous phase and the hydrocarbon the discontinuous phase. The limit of the catalyst concentration is determined by the hydrocarbon content of the catalyst removed from the bottom of the settler for recycling. Recycle of the catalyst is accomplished by conducting the catalyst in the bottom of the settler to the reactor through pipes 14 and 13 to pump 15, thence by pipe 16 back to the reactor.

The practice of this invention necessitates that the catalyst be maintained in substantial contact with alkylatable hydrocarbon, and as the recycle catalyst contains the lowest proportion of hydrocarbon in the catalyst cycle, such is accomplished by recycling incompletely settled catalyst containing a substantial amount of hydrocarbon. It is preferable that the hydrocarbon to catalyst liquid volume ratio in the recycle is not less than 1:1. Maintaining a substantial amount of hydrocarbon in the recycle catalyst is accomplished by limiting the residence time of the catalyst in the settler to not more than five minutes, and preferably not more than one to three minutes. The control of the hydrocarbon to catalyst ratio of the recycled catalyst may be accomplished by suitable adjustment of the catalyst level in the primary settler.

From the upper part of the primary settler, the hydrocarbon phase, containing 0.1 to 0.5 weight per cent of suspended catalyst, passes via pipe 6 to a T, where the stream is divided. A major portion of the stream passes via pump 7 and pipe 8 to cooler 9, where heat of reaction is removed. The cooled stream passes through pipes 10 and 29 to reactor 3, thus controlling the temperature of reactor 3. Reaction temperature is usually maintained in the range of 100 to 150° F.

If desired, a portion or all of the recirculation stream may be passed through line 17 to catalyst line 13, the catalyst and hydrocarbon being intimately mixed in pump 15, thus effecting additional external contacting of hydrocarbon and catalyst. Isobutane may also be employed for this purpose, isobutane passing via pipes 29 and 30 to pipe 13.

The second portion of the recirculation stream carried by pipe 6 is conducted by pipe 11 to secondary settler 12, in which the small amount of catalyst contained in the recirculation stream is further reduced by gravity settling to a trace in the upper portion of the settler. The catalyst settling to the lower part of the settler is conducted by pipe 13 to join the recycle catalyst stream from pipe 14. In this settler also the recycle catalyst must contain a substantial proportion of alkylatable hydrocarbon, the liquid volume ratio of hydrocarbon to catalyst being not less than 1:1. If desired, this settler may be operated without a catalyst level, both catalyst and hydrocarbon being removed through pipe 13. The hydrocarbon from the upper zone of the secondary settler is conducted through pipes 18 and 19 to caustic wash 20 to remove any aluminum halide catalyst and halogen acid that may remain in the hydrocarbon. In some cases the primary settler hydrocarbon phase is sufficiently free of catalyst to justify by-passing the secondary settler, such being accomplished by use of the valves provided in pipes 11, 13, 18 and 19, a portion of the hydrocarbon stream from the primary settler being conducted directly to a water and/or caustic wash by pipe 19.

From the caustic wash 20, the hydrocarbon is conducted by pipe 21 to a fractionating means 22 where propane and lighter components are separated and conducted by pipe 23 to suitable utilization not shown. Isobutane separated herein is recycled to the reactor by pipe 24, as previously described. The normal butane separated in this fractionating means is conducted by pipe 25 to a butane isomerization unit, not shown, or utilized in other manner. Aviation gasoline range alkylate is conducted to storage or blending by pipe 26. Alkylate bottoms are conducted by pipe 27 to motor fuel storage, blending, or other suitable use.

Activity of the catalyst is maintained by drawing off a portion of the recycle catalyst from pipe 13 and/or pipe 14 through pipe 32 to mixer 35 via pipe 33. Aluminum halide from a source not shown is added to the catalyst with vigorous agitation and conducted by pipe 36 to the recycle catalyst stream and thence to the reactor. The rate of aluminum halide addition is regulated to maintain conversion or product quality as previously discussed. Spent catalyst is withdrawn from the system via pipe 34.

When spent catalyst is used to dry the recycle and fresh isobutane stream, spent catalyst may be conducted by pipe 37 to dryer 28. Spent drying agent is discharged from the dryer by pipe 38.

In reactors incorporating internal cooling and temperature control, the hydrocarbon recirculation stream is not used. The valves in pipes 10 and 17 are provided for use with a reactor of such design.

Figure 2 illustrates a second modification of my invention. In this figure, the product separation and recovery system is not shown, to simplify the drawing. It should perform the same functions as shown in Figure 1.

Recycle and fresh isobutane and halogen acid activator, if used, are added to reactor 3 by pipe 29. The reactor is operated as discussed in the previous illustration.

Emulsion is continuously removed from the reactor and conducted by pipe 4 to primary settler 39, which is provided with a plurality of entrance points at different heights, all entrance points being in the lower portion of the settler. A single entrance is chosen so that the reactor emulsion enters a zone in the settler that is of relatively high catalyst concentration, this point being near the bottom of the settler so that the hydrocarbon separating from the emulsion rises through the catalyst above the point of emulsion entrance, thus effectively preventing the catalyst in the zone of the settler above the emulsion entrance point from being out of substantial contact with an alkylatable hydrocarbon. Catalyst from the settler is recycled to the reactor through pipe 14 by pump 15 and through pipe 16 at such a rate that the catalyst below the level of the emulsion entrance point has insufficient time to effect substantial separation from an alkylatable hydrocarbon. The catalyst residence time limitations and limitations of hydrocarbon content of the recycle catalyst stream set in the previous illustration also apply to this settler.

Hydrocarbon in the upper part of the primary settler containing a small amount of catalyst is conducted by means of a pipe 6 to pump 7, through pipe 8 to heat exchanger 9, through pipe 10 to pipe 29, where it joins the isobutane stream to be returned to the reactor, the purpose of this hydrocarbon recirculation stream being for reactor temperature control.

A portion of the hydrocarbon recirculation stream removed from the primary settler is conducted from pipe 6 by pipe 11 to secondary settler 40, the entrance of this stream to the settler being in the lower section so the catalyst above the entrance point is contacted by the hydrocarbon separating from the entering stream and rising to the upper zone of the settler, thus providing in this settler also a positive means of keeping the catalyst above the settler entrance in substantial contact with alkylatable hydrocarbon. The settled catalyst is removed from the separator through pipe 13 and joins the recycle catalyst from the primary settler flowing through pipe 14.

In case the hydrocarbon withdrawn from the primary settler contains sufficiently small amount of catalyst that the use of a secondary settler is not warranted, the secondary settler can be by-passed by an arrangement such as described in Figure 1.

Spent catalyst is withdrawn from the system by pipe 32. Catalyst fortification may be accomplished in the manner shown in Figure 1.

Substantially catalyst-free hydrocarbon is withdrawn from the secondary settler through pipe 41 to a caustic wash and product recovery system such as described in Figure 1.

Figure 3 shows a third modification of my invention.

In this modification, isobutane and hydrogen halide are added to reactor 3 through pipe 37. The olefin is added to the reactor by pipe 2. The reactor in this illustration is operated within the hydrocarbon to catalyst ratios referred to in the description of Figure 1.

Very intimate mixing is maintained in the reactor. A portion of the reactor emulsion is continuously withdrawn from the reactor and conducted by pipe 42 to heat exchanger 9, thence by pipe 45 to pump 15, thence through pipe 16 back to the reactor. The heat exchanger is used here to control the reactor temperature. In this recycle system, the flow is preferably turbulent so that maintenance of the emulsion is favored.

Through pipe 43, a portion of the recycle stream is conducted from pipe 42 to settler 44. The limits of hydrocarbon content in the catalyst recycle stream set in the first example, both maximum and preferable, apply to this catalyst recycle stream also. Residence time of the catalyst in the settler is not to exceed five minutes, and it is preferable to limit the residence time of the catalyst in the settler to not more than one to three minutes.

The catalyst settling in the settler is conducted through pipe 46 to join the emulsion stream in pipe 45 and returns to the reactor. Spent catalyst may be withdrawn through pipe 47. Catalyst activity may be maintained as shown in Figure 1 and the corresponding explanation.

The upper portion of the settler contains substantially catalyst-free hydrocarbon, and this hydrocarbon is continuously withdrawn from the settler to the caustic wash and product recovery system shown in Figure 1 and its explanation.

SPECIFIC EXAMPLES

The following examples are shown to illustrate the effect of my invention in practice.

*Example I*

This example shows the rapid increase in catalyst viscosity encountered with propylene-rich feed stocks when catalyst phase is allowed to separate from the alkylatable hydrocarbon contrary to my invention. A mixed paraffin-olefin feed of the composition shown below was continuously charged to a 560 cc. reactor equipped with an efficient stirrer under the conditions listed below. An emulsion of hydrocarbon and catalyst was continuously withdrawn to a Jerguson gauge settler. Substantially catalyst-free hydrocarbon was withdrawn from the settler, washed with caustic and debutanized. Substantially hydrocarbon-free aluminum chloride-hydrocarbon complex catalyst was recycled to the reactor. The feed composition and operating conditions follow:

Feed composition:
| | | |
|---|---|---|
| Ethylene | mol per cent | 11.7 |
| Propylene | do | 3.0 |
| Propane | do | 8.6 |
| Isobutane | do | 69.7 |
| Normal butane | do | 7.0 |
| Mol ratio, ethylene/propylene | | 3.9/1 |
| Feed charge rate | pounds per hour | 1.17 |
| Temperature | °F | 130 |
| Pressure | p.s.i.g | 300 |
| Hydrocarbon/catalyst volume ratio in reactor | | 3.1/1 |

Conversion of olefin was maintained at about ninety-five per cent. At the start of the run, the catalyst viscosity was 110 centistokes at 100° F. After thirty-seven hours of operation, the viscosity of the catalyst had risen to over 1000 centistokes at 100° F.

*Example II*

In the second run, the apparatus was modified to provide means of maintaining the catalyst in substantial contact with an alkylatable hydrocarbon at all times, in accordance with my invention. This was done by placing a baffle in the upper portion of the 560 cc. stirred reactor and above the reactor placing a standpipe of one-half inch pipe twenty-four inches long in a substantially vertical position. By this arrangement, very incomplete separation of the hydrocarbon from the catalyst was effected in the baffled zone of the reactor with virtually immediate re-entrance of the catalyst to the reactor zone in which very intimate mixing was maintained. The small amount of catalyst rising into the standpipe separated and fell back to the reactor through a mixture containing a high proportion of alkylatable hydrocarbon. Substantially catalyst-free hydrocarbon was removed from the top of the standpipe to a caustic wash and fractionation.

The run was carried out using an aluminum chloride-kerosene complex catalyst, the initial viscosity being 100 centistokes measured at 100° F. The hydrocarbon feed was charged and hydrocarbon effluent withdrawn continuously.

The feed composition and operating conditions follow:

Feed composition, mol per cent:
| | |
|---|---|
| Ethylene | 9.2 |
| Propylene | 2.2 |
| Propane | 13.8 |
| Isobutane | 69.2 |
| Normal butane | 5.6 |
| Ethylene/propylene ratio | 4.2/1 |
| Feed charge rate pounds per hour | 1.03 |
| Temperature °F | 130 |
| Pressure p.s.i.g | 300 |
| Hydrocarbon/catalyst volume ratio in reactor | 1.05/1 |

Conversion of olefin was maintained at about 97 per cent throughout this run. At the end of eight hours operation, the catalyst viscosity was 170 centistokes at 100° F. At the end of thirty-three hours, the viscosity was constant at 200 centistokes at 100° F., thus showing the distinct advantage of practicing my invention.

*Example III*

A propylene-isobutane mixture containing 5.2 weight per cent of propylene was contacted with an aluminum chloride-hydrocarbon complex catalyst in the liquid phase at 130° F. in the manner described in Example II. The catalyst viscosity remained below about 1000 centistokes at 100° F. The alkylate contained 8 per cent of pentanes, 9 per cent of hexanes, 66 per cent of heptanes and 17 per cent of octanes and heavier products.

As discussed herein, the alkylatable hydrocarbon which is retained or admixed with the catalyst to permit maintenance of proper viscosity is principally composed of unreacted isoparaffinic feed, but also contains varying proportions of isoparaffinic product or alkylate. Where desired, alkylatable hydrocarbons may be introduced from an outside source to provide the required concentration of alkylatable hydrocarbon. While it is not desired to confine this invention to any particular theory of the function of the alkylatable hydrocarbon in maintaining viscosity, it is believed that such material preferentially reacts with olefins present in the catalyst and thus avoids or minimizes polymerization to higher boiling viscous materials. In general, the alkylatable hydrocarbons referred to are paraffins which contain a tertiary carbon atom and exist in liquid phase under conditions of the reaction.

I claim:

1. In a process for the alkylation of an isoparaffin with a low-boiling olefin in which said isoparaffin and said olefin are contacted in an alkylation zone with an aluminum halide-hydrocarbon complex catalyst, the reaction mixture and said catalyst are removed from the alkylation zone for separation of catalyst and reaction products, and a catalyst complex-hydrocarbon mixture is recycled to said alkylation zone, the method of maintaining said catalyst at a substantially low viscosity which comprises effecting only partial separation of said catalyst and recovering a catalyst mixture containing aluminum halide-hydrocarbon complex and alkylatable hydrocarbons comprising unreacted isoparaffins in the proportion of at least one liquid volume of said alkylatable hydrocarbons for each liquid volume of aluminum halide-hydrocarbon complex, and retaining with said catalyst throughout its entire cycle in the system at least one liquid volume of alkylatable hydrocarbon for each liquid volume of catalyst whereby the catalyst is dispersed in discontinuous phase in said hydrocarbon, said hydrocarbon being the continuous phase.

2. In a process for the alkylation of isoparaffin with a low-boiling olefin in which said isoparaffin and said olefin are contacted in an alkylation zone with an aluminum chloride-hydrocarbon complex catalyst, the reaction mixture and said catalyst are removed to a settling zone for separation of catalyst and reaction products, and a catalyst complex-hydrocarbon mixture is recycled to said alkylation zone, the method of maintaining said catalyst at a substantially low viscosity which comprises effecting only partial settling of said catalyst in said settling zone and recovering a catalyst mixture containing aluminum chloride-hydrocarbon complex and alkylatable hydrocarbons comprising unreacted isoparaffins in the proportion of at least one liquid volume of said alkylatable hydrocarbons for each liquid volume of aluminum chloride-hydrocarbon complex, and retaining with said catalyst throughout its entire cycle in the system at least one liquid volume of alkylatable hydrocarbon for each liquid volume of catalyst whereby the catalyst is dispersed in discontinuous phase in said hydrocarbon, said hydrocarbons being the continuous phase.

3. In a process for the alkylation of isobutane with a normally gaseous olefin in which said isobutane and said olefin are contacted in an alkylation zone with an aluminum halide-hydrocarbon complex catalyst, the reaction mixture and said catalyst are removed from the alkylation zone for separation of catalyst and reaction products, and a catalyst complex-hydrocarbon mixture is recycled to said alkylation zone, the method of maintaining said catalyst at a substantially low viscosity which comprises effecting only partial separation of said catalyst and recovering a catalyst mixture from said separation containing aluminum halide-hydrocarbon complex and alkylatable hydrocarbons comprising unreacted isobutane in the proportion of at least one liquid volume of said alkylatable hydrocarbon for each liquid volume of aluminum halide-hydrocarbon catalyst, and retaining with said catalyst throughout its entire cycle in the system at least one liquid volume of alkylatable hydrocarbon for each liquid volume of catalyst.

HAROLD J. HEPP.

REFERENCES CITED

The following references are of record in the file of this patent:

UNITED STATES PATENTS

| Number | Name | Date |
|---|---|---|
| 2,168,271 | Perquin et al. | Aug. 1, 1939 |
| 2,198,595 | Amos et al. | Apr. 30, 1940 |
| 2,222,012 | Amos et al. | Nov. 19, 1940 |
| 2,320,293 | Ostergaard | May 25, 1943 |
| 2,349,821 | Fragen | May 30, 1944 |
| 2,409,389 | Ringham | Oct. 15, 1946 |